United States Patent
Lin et al.

(10) Patent No.: US 10,013,629 B2
(45) Date of Patent: Jul. 3, 2018

(54) METHOD, PORTABLE DEVICE, AND SYSTEM FOR DETECTING PHYSIOLOGICAL PHENOTYPE OF CROPS

(71) Applicant: INSTITUTE FOR INFORMATION INDUSTRY, Taipei (TW)

(72) Inventors: Chien-Der Lin, Kaohsiung (TW); Yung-Hsing Peng, Kaohsiung (TW); Chin-Shun Hsu, Kaohsiung (TW)

(73) Assignee: Institute For Information Industry, Taipei (TW)

( * ) Notice: Subject to any disclaimer, the term of this patent is extended or adjusted under 35 U.S.C. 154(b) by 137 days.

(21) Appl. No.: 15/145,275

(22) Filed: May 3, 2016

(65) Prior Publication Data
US 2017/0148181 A1    May 25, 2017

(30) Foreign Application Priority Data
Nov. 25, 2015 (TW) .............................. 104139130 A

(51) Int. Cl.
G06T 7/00 (2017.01)
G06K 9/46 (2006.01)
G06T 7/40 (2017.01)
G06T 7/60 (2017.01)
G06K 9/00 (2006.01)

(52) U.S. Cl.
CPC ....... *G06K 9/4652* (2013.01); *G06K 9/00657* (2013.01); *G06T 7/0004* (2013.01); *G06T 7/408* (2013.01); *G06T 7/60* (2013.01); *G06T 2207/10024* (2013.01); *G06T 2207/30128* (2013.01)

(58) Field of Classification Search
CPC ............. G06K 9/00657; G06K 9/4652; G06K 2209/17; G06T 7/90; G06T 2207/10024; G06T 2207/30128
See application file for complete search history.

(56) References Cited

U.S. PATENT DOCUMENTS 5,253,302 A * 10/1993 Massen .............................. 382/1
2016/0187199 A1* 6/2016 Brunk et al. .......... G01J 3/2823
348/89
2016/0292662 A1* 10/2016 Kobayashi et al. . G06Q 20/208

* cited by examiner

*Primary Examiner* — Andrew W Johns

(57) ABSTRACT

The present disclosure provides a method, portable device, and system for detecting physiological phenotype of crops, which determines a digital color chart according to the distance between a designated crop and the portable device and the present environmental brightness, and then determines that the appearance color of the designated crop belongs to which control color information of the selected digital color chart. It can avoid causing the error result because of the influence of the subjective determination and the environmental light. Therefore, the selected control color information may correspond to physiology information of the designated crop, to provide farmers with an understanding the present physiological phenotype of the designated crop.

17 Claims, 4 Drawing Sheets

METHOD, PORTABLE DEVICE, AND SYSTEM FOR DETECTING PHYSIOLOGICAL PHENOTYPE OF CROPS

BACKGROUND

1. Technical Field

The present disclosure relates to a method, a portable device, and a system for detecting physiological phenotype of crops, in particular, to a method, a portable device, and a system for detecting physiological phenotype of crops according to the color appearance of crops.

2. Description of Related Art

Generally speaking, the color appearance of crops is related to the decision of fertilizing or maturing. Therefore, farmers use a leaf color chart or colorimetric card to decide the color appearance of crops for understanding the physiological phenotype of crops (e.g., the growth of crops), so as to guide farm work. For example, farmers use the leaf color chart to determine the color of rice leaf for inferring the nitrogen application rate. For another example, farmers use the colorimetric card to determine the color appearance of fruits for inferring the maturity degree of the fruits.

However, determining the appearance color of crops by the leaf color chart or the colorimetric card needs to rely on human decision and separate records, so that determining the result it is easy to generate errors and the record is usually not complete. In addition, farmers usually determine the color appearance of crops under the open environment (e.g., outdoor environment). The environmental light is usually different, it may seriously influence the result of the color appearance of crops determined from farmers, to generate higher error and to misjudge physiology information of crops. Therefore, a method, a portable device, and a system for automatically detecting appearance color of crops provided may reduce the misjudgment of the determine result substantially.

SUMMARY

An exemplary embodiment of the present disclosure provides a method for detecting physiological phenotype of crops, adapted for a portable device, which detects a physiological phenotype of a designated crop. The method comprises the following steps. Step A: selecting a plurality of digital color charts corresponding to the designated crop from a color chart database, wherein each digital color chart corresponds to a specific brightness and a specified object distance, each digital color chart has a plurality of control color information, and each control color information data corresponds to physiological information of the designated crop; Step B: capturing an image to be detected of the designated crop and acquiring color information corresponding to the image to be detected; Step C: detecting an environmental brightness and an object distance between the designated crop and the portable device; Step D: determining an adaptive digital color chart corresponding to the image to be detected from the digital color charts according to the environmental brightness and the object distance; Step E: comparing the color information of the image to be detected with the control color information of the adaptive digital color chart, and selecting one of the control color information according to the correlation with the control color information and the color information; and displaying the corresponding physiology information according to the selected control color information.

An exemplary embodiment of the present disclosure provides a portable device for detecting crops, used for detecting a physiological phenotype of a designated crop. The portable device comprises a camera, an environmental light sensor, a distance sensor, a color chart database, and a processor. The camera is configured for capturing an image to be detected of the designated crop. The environmental light sensor is configured for detecting an environmental brightness. The distance sensor is configured for detecting an object distance between the designated crop and the portable device. The color chart database is configured for storing a plurality of digital color charts of the designated crop. Each digital color chart corresponds to a specific brightness and a specified object distance, and has a plurality of control color information. Each control color information corresponds to physiology information of the designated crop. The processor is electrically connected to the camera, the environmental light sensor, the distance sensor, and the color chart database. The processor is configured for acquiring color information corresponding to the image to be detected, selecting the digital color charts corresponding to the designated crop from the color chart database according to the designated crop. The processor determines an adaptive digital color chart corresponding to the image to be detected from the digital color charts according to the environmental brightness and the object distance. The processor compares the color information of the image to be detected with the control color information of the adaptive digital color chart, to select one of the control color information according to the correlation with the control color information and the color information, and to display the corresponding physiology information according to the selected control color information in a displayer.

An exemplary embodiment of the present disclosure provides a system for detecting crops, used for detecting a physiological phenotype of a designated crop. The system comprises a remote server and a portable device. The remote server is configured for storing a plurality of digital color charts of the designated crop. Each digital color chart corresponds to a specific brightness and a specified object distance, and has a plurality of control color information. Each control color information corresponds to physiology information of the designated crop. The portable device is coupled to the remote server through a wireless network, to receive the digital color chart, the specific brightness, the specified object distance of each digital color chart, and the control color information. The portable device comprises an a camera, an environmental light sensor, a distance sensor, and a processor. The camera is configured for capturing an image to be detected of the designated crop. The environmental light sensor is configured for detecting an environmental brightness. The distance sensor is configured for detecting an object distance between the designated crop and the portable device. The processor is electrically connected to the camera, the environmental light sensor, the distance sensor, and the color chart database. The processor is configured for acquiring color information corresponding to the image to be detected. The processor selects the digital color charts corresponding to the designated crop from the color chart database according to the designated crop. The processor determines an adaptive digital color chart corresponding to the image to be detected from the digital color charts according to the environmental brightness and the object distance. The processor compares the color information of the image to be detected with the control color information of the adaptive digital color chart, to select one of the control color information data according to the correlation with the control color information and the color information, and to transmit the selected control color information to the remote server through the wireless network for displaying the corresponding physiology information.

To sum up, the exemplary embodiments of the present disclosure provide a method, a portable device, and a system for detecting physiological phenotype of crops, which determine a digital color chart according to the distance between a designated crop and the portable detection device and the present environmental brightness, and then determine that the appearance color of the designated crop belongs to which control color information of the selected digital color chart. It can avoid causing the error result because of the influence of the subjective determination and the environmental light. Therefore, the selected control color information may correspond to physiology information of the designated crop, to provide farmers understanding the present physiological phenotype of the designated crop.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
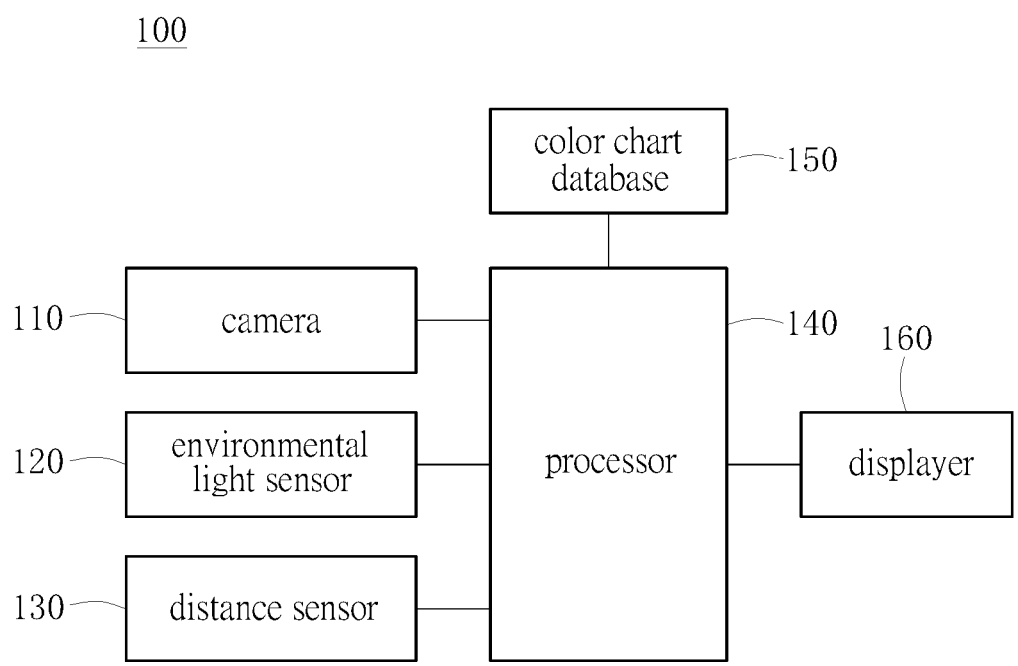
FIG. 1 is a diagram of a portable device according to an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

This embodiment provides a method, a portable device, and a system for detecting physiological phenotype of crops, which capture the color information of the image of a designated crop (e.g., leaves of rice plant, banana, tomato, and etc.), to determine which control color information of the digital color charts the captured color information belongs to. More specifically, the portable device selects one of the digital color charts, which is suitable for the present environmental brightness and the distance between the designated crop and the portable device, to reduce the influence of the environmental brightness and to remove the saturation error because of the different distance between the designated crop and the portable device. Next, determining to which control color information of the selected digital color chart the color information of the image belongs. The selected control color information may correspond to physiology information of the designated crop which is provided for farmers to understand the present physiological phenotype of the designated crop. Therefore, it can avoid causing a saturation error because of any subjective determination and different distances, or causing an error result because of the influence of the environmental light, thereby causing the misjudgment of physiological phenotype of the crops. The method, the portable device, and the system for detecting physiological phenotype of crops provided in the exemplary embodiment of the present disclosure will be described in the following paragraphs.

Firstly, please refer to FIG. 1, which shows a diagram of a portable device according to an exemplary embodiment of the present disclosure. As shown in FIG. 1, the portable device 100 is used for detecting physiological phenotype (e.g., the growth) of a designated crop (e.g., rice leaf, banana, tomato, and etc.), which is provided for farmers to understand the present physiological phenotype of the designated crop. The portable device 100 includes an a camera 110, an environmental light sensor 120, a distance sensor 130, a processor 140, a color chart database 150, and a displayer 160. In the present disclosure, the portable device 100 can be a smart phone, tablet computer, notebook, or other portable devices. The present disclosure is not limited thereto.

Figure 2:
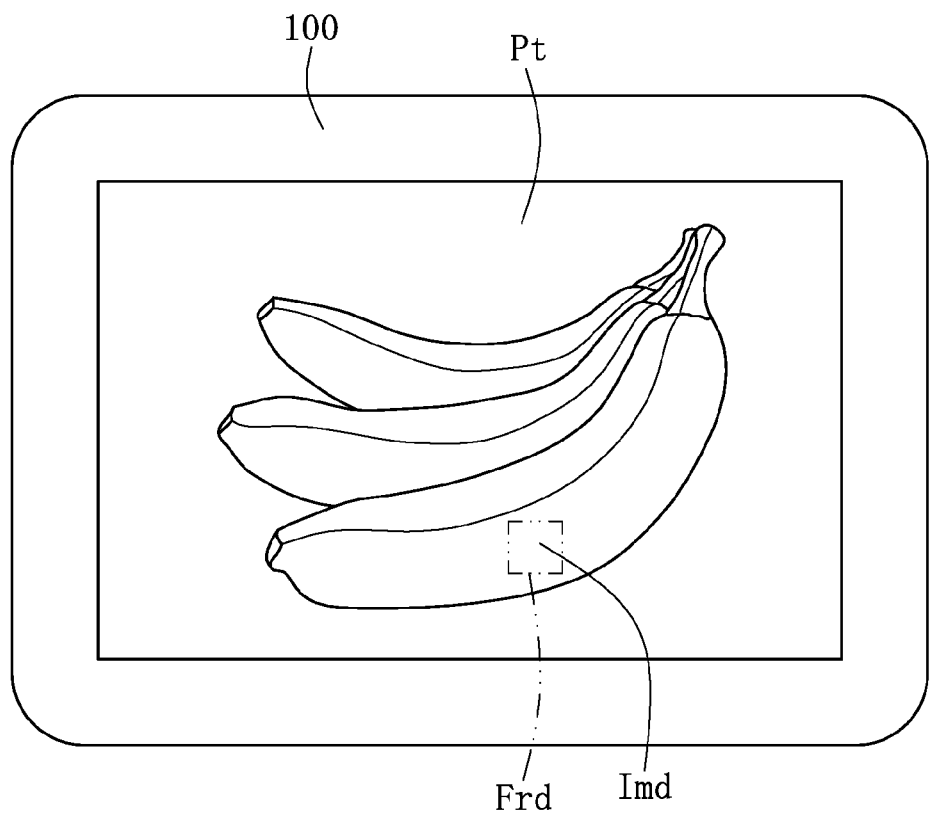
FIG. 2 is a diagram of an image to be detected according to an exemplary embodiment of the present disclosure.

Please refer to FIG. 2 in conjunction with FIG. 1. FIG. 2 shows a diagram of an image to be detected according to an exemplary embodiment of the present disclosure. The camera 110 is used for capturing an image to be detected Imd of the designated crop. More specifically, the camera 110 takes a crop image Pt indicating the designated crop. The processor 140 displays a region for detection Frd through the displayer 160 and captures the image to be detected Imd from the crop image Pt through the region for detection Frd, so that the processor 140 processes the image to be detected Imd. For example, the designated crop is banana. Farmers take the crop image Pt indicating banana through the camera 110. Farmers can move the position of the region for detection Frd, to capture the image to be detected Imd from the crop image Pt and to provide it to the processor 140 for determining the present physiological phenotype of the banana.

The environmental light sensor 120 is used for detecting an environmental brightness and transmits the environmental brightness to the processor 140. The distance sensor 130 is used for detecting an object distance between the designated crop and the portable device 100. More specifically, the environmental light sensor 120 and the distance sensor 130 are preferably configured near the camera 110, to detect the more accurate environmental brightness and object distance. The environmental light sensor 120 and the distance sensor 130 can also be configured to another position of the portable device 100. The present disclosure is not limited thereto.

The color chart database 150 stores a plurality of digital color charts of the crops. It means that the digital color charts of the crops have the digital color charts of each designated crop. Each digital color chart corresponds to a specific brightness and a specified object distance. Each digital color chart has a plurality of control color information. Each of the control color information corresponds to physiology information of the designated crop. For example, Table 1 shows the digital color charts of banana taken as the designated crop.

TABLE 1

| digital color chart | brightness (Lux) | object distance (cm) | digital color chart | brightness (Lux) | object distance (cm) |
|---|---|---|---|---|---|
| 1 | 400 | 10 | 10 | 600 | 16 |
| 2 | 400 | 12 | 11 | 600 | 18 |
| 3 | 400 | 14 | 12 | 600 | 20 |
| 4 | 400 | 16 | 13 | 800 | 10 |
| 5 | 400 | 18 | 14 | 800 | 12 |
| 6 | 400 | 20 | 15 | 800 | 14 |
| 7 | 600 | 10 | 16 | 800 | 16 |
| 8 | 600 | 12 | 17 | 800 | 18 |
| 9 | 600 | 14 | 18 | 800 | 20 |

As shown in Table 1, there are 18 digital color charts related to banana in the color chart database 150, i.e., digital color charts 1, 2, 3, 4, 5, 6, 7, 8, 9, 10, 11, 12, 13, 14, 15, 16, 17 and 18. Each of the digital color charts 1-18 corresponds a specific brightness and a specified object distance. Each digital color chart 1-18 has a plurality of control color information, to provide to the processor 140 for determining the control color information for the image to be detected Imd from the digital color charts 1-18.

For example, the specific brightness and the specified object distance corresponding to the digital color chart 10 are respectively 600 Lux and 10 cm. The control color information corresponding to the digital color chart 10 are shown in Table 2. The digital color chart 10 has four control color information data, i.e., the control color information D1, D2, D3, and D4. Each control color information D1-D4 has red pixel, green pixel, and blue pixel. Each control color information D1-D4 corresponds to physiology information of the banana taken as the designated crop. In this example, the control color information D1-D4 corresponds to different degrees of maturation of the banana. How to determine the control color information D1-D4 for the image Imd to be detected from the digital color charts 1-18 with respect to the processor 140 is illustrated in the following disclosure. The present disclosure is not limited thereto.

TABLE 2

| digital color chart | control color information | red pixel | green pixel | blue pixel | mature degree |
|---|---|---|---|---|---|
| 10 | D1 | 35 | 88 | 8 | 81~100% |
|  | D2 | 23 | 69 | 0 | 61~80% |
|  | D3 | 19 | 59 | 0 | 31~60% |
|  | D4 | 14 | 64 | 0 | 0~30% |

The processor 140 is electrically connected to the camera 110, the environment brightness sensor 120, the distance sensor 130, and the color chart database 150. The processor 140 receives the image to be detected Imd generated from the camera 110, to acquire color information corresponding to the image to be detected Imd. More specifically, during acquiring the color information of the image to be detected Imd, the processor 140 averages pixels of the image to be detected Imd, to acquire the color information indicating the image to be detected Imd. Or the processor 140 selects the pixels having the most amount of the same color from the pixels of the image to be detected, to acquire the color information indicating the image to be detected Imd. The processor 140 can also use other methods to acquire the color information of the image to be detected Imd. The present disclosure is not limited thereto. Besides, in the present disclosure, the color information of the image to be detected Imd represents an RGB color model (combination of red pixel, green pixel, and blue pixel). The representation of the color information is the same as the representation of the control color information of the digital color chart. This means that, when the control color information data of the digital color chart is represented by the YCbCr color model, the color information data is represented by the YCbCr color model equally.

Next, the processor 140 selects a plurality of digital color charts corresponding to the designated crop from the color chart database 150. Then the processor 140 determines an adaptive digital color chart corresponding to the image to be detected Imd from the digital color charts according to the environmental brightness and the object distance. More specifically, the processor 140 selects one of the digital color charts having the highest correlation with the environmental brightness and the object distance according to the specific brightness and the specified object distance of each digital color chart of the designated crop, and takes the selected digital color chart as the adaptive digital color chart for the image to be detected Imd. Therefore, the processor 140 can reduce the influence of the environmental brightness and the saturation error because of the different object distance. It is worth to note that the digital color chart having the highest correlation with the environmental brightness and the object distance indicates that the specific brightness and the specified object distance of the digital color chart are closest to the environmental brightness and the object distance.

In the present disclosure, the processor 140 selects at least one digital color chart having the highest correlation with the environmental brightness from the digital color charts according to the specific brightness of each digital color chart of the designated crop (e.g., the environmental brightness is closest to the specific brightness of the selected digital color chart). Next, the processor 140 selects one of the digital color charts having the highest correlation with the object distance (indicating that the object distance is closest to the specified object distance of the selected digital color chart) from at least one digital color chart having the highest correlation with the environmental brightness according to the specified object distance of each digital color chart, and takes the selected digital color chart as the adaptive digital color chart for the image to be detected Imd. This means that the processor 140 firstly selects at least one digital color chart being closest to the environmental brightness from the digital color charts of the designated crop. Then the processor 140 selects one of the digital color charts being closest to the object distance from the selected digital color chart. Accordingly, the last selected digital color chart is closest to the environmental brightness and the object distance of the designated crop at that time.

Carrying on with the example and Table 1 above, the processor 140 selects the digital color charts 1-18 of banana from the color chart database 150. Each of digital color charts 1-18 has the specific brightness and the specified object distance. At present, when the environmental light sensor detects the environmental brightness to be 550 Lux, and the distance sensor 130 detects the object distance to be 15.5 cm, the processor 140 firstly selects the digital color charts 7-12 having the highest correlation with the environmental brightness (i.e., 550 Lux) from the digital color charts 1-18 according to the specific brightness 400 Lux, 600 Lux, and 800 Lux of each digital color chart 1-18 (i.e., the digital color charts 7-12 having the specific brightness 600 Lux are closest to 550 Lux). Next, the processor 140 selects the digital color chart 10 having the highest correlation with the object distance (i.e., 15.5 cm) from the digital color charts 7-12 according to the specified object distance 10 cm, 12 cm, 14 cm, 16 cm, 18 cm, and 20 cm of the digital color charts 7-12 (i.e., the digital color chart 10 having the specified object distance 16 cm is closest to 15.5 cm). Then the processor 140 takes the last selected digital color chart 10 as the adaptive digital color chart. By the above way, the processor 140 can reduce the influence of the environmental brightness and the saturation error because of different object distance.

In another disclosure, the processor 140 can re-generate the needed adaptive digital color chart according to the existing digital color chart. The processor 140 firstly selects at least two digital color charts having the higher correlation with the environmental brightness and the object distance from the digital color charts according to the specific brightness and the specified object distance of each digital color chart. Then the processor 140 calculates the control color information for the adaptive digital color chart according to the selected digital color charts, and calculates physiological phenotype corresponding to each control color information.

At present, the specific brightness and the specified object distance of the adaptive digital color chart are respectively the environmental brightness and the object distance. For example, the processor 140 calculates the control color information for the adaptive digital color chart by an algorithm. The aforementioned algorithm can be disposed by the actual condition of the digital color charts and shall not be limited to the examples provided by the exemplary embodiment. The processor 140 selecting four digital color charts having the higher correlation with the environmental brightness and the object distance from the aforementioned digital color charts and then generating a new digital color chart will be described in the following example.

For example, the processor 140 selects the digital color charts 1-18 of banana shown in Table 1 from the color chart database 150. Each of the digital color charts 1-18 has the specific brightness and the specified object distance. It is worth to note that, when the environmental light sensor 120 detects the environmental brightness to be 500 Lux, and the distance sensor 130 detects the object distance to be 15 cm, the specific brightness and the specified object distance of the adaptive digital color chart are respectively 500 Lux and 15 cm. Next, the processor 140 selects four digital color charts 4-5, 10-11 having the higher correlation with the environmental brightness (500 Lux) and the object distance (15 cm) from the digital color charts 1-18, and then renumbers the digital color charts 4-5, 10-11 as the digital color charts 1-4.

The control color information of the renumbered digital color charts 1-4 are shown as <Table 3>. Each of the renumbered digital color charts 1-4 has two control color information data, i.e., the control color information D1 and D2. Each control color information D1 and D2 has red pixel, green pixel, and blue pixel.

TABLE 3

| digital color chart | brightness (Lux) | object distance (cm) | control color information | red pixel | green pixel | blue pixel |
|---|---|---|---|---|---|---|
| 1 | 400 | 16 | D1 | 35 | 88 | 8 |
|   |   |   | D2 | 50 | 96 | 10 |
| 2 | 400 | 18 | D1 | 23 | 69 | 0 |
|   |   |   | D2 | 42 | 80 | 0 |
| 3 | 600 | 16 | D1 | 60 | 30 | 0 |
|   |   |   | D2 | 81 | 53 | 5 |

TABLE 3-continued

| digital color chart | brightness (Lux) | object distance (cm) | control color information | red pixel | green pixel | blue pixel |
|---|---|---|---|---|---|---|
| 4 | 600 | 18 | D1 | 79 | 136 | 30 |
|   |   |   | D2 | 82 | 140 | 37 |

After the processor 140 gets the renumbered digital color charts 1-4, the processor 140 calculates the control color information D1, D2 for the adaptive digital color chart by an algorithm. The algorithms (1), (2), and (3) are presented below.

$$\text{red pixel} = \frac{\sum_{i=1}^{N} \frac{R_i}{(dist_i)^n}}{\sum_{i=1}^{N} \frac{1}{(dist_i)^n}} \quad \text{algorithm (1)}$$

wherein, N is the number of the processor 140 selected digital color charts (in the present disclosure, the processor 140 selects four digital color charts 4-5, 10-11 and renumbers the digital color charts 4-5, 10-11 as the digital color charts 1-4). n is the distance coefficient, which is more than or equal to 1. $dist_i$ is the distance between the adaptive digital color chart and the ith digital color chart. $R_i$ is red pixel of the ith digital color chart (in the present disclosure, the red pixels corresponding to the renumbered digital color charts 1-4 are 35, 23, 60, and 79 respectively.)

$$\text{green pixel} = \frac{\sum_{i=1}^{N} \frac{G_i}{(dist_i)^n}}{\sum_{i=1}^{N} \frac{1}{(dist_i)^n}} \quad \text{algorithm (2)}$$

wherein, N is the number of the processor 140 selected digital color charts (in the present disclosure, the processor 140 selects four digital color charts 4-5, 10-11 and renumbers the digital color charts 4-5, 10-11 as the digital color charts 1-4). n is the distance coefficient, which is more than or equal to 1. $dist_i$ is the distance between the adaptive digital color chart and the ith digital color chart. $G_i$ is green pixel of the ith digital color chart (in the present disclosure, the green pixels corresponding to the renumbered digital color charts 1-4 are 88, 69, 30, and 136 respectively.)

$$\text{blue pixel} = \frac{\sum_{i=1}^{N} \frac{B_i}{(dist_i)^n}}{\sum_{i=1}^{N} \frac{1}{(dist_i)^n}} \quad \text{algorithm (3)}$$

wherein, N is the number of the processor 140 selected digital color charts (in the present disclosure, the processor 140 selects four digital color charts 4-5, 10-11 and renumbers the digital color charts 4-5, 10-11 as the digital color charts 1-4). n is the distance coefficient, which is more than or equal to 1. $dist_i$ is the distance between the adaptive digital color chart and the ith digital color chart. $B_i$ is blue pixel of the ith digital color chart (in the present disclosure, the blue pixels corresponding to the renumbered digital color charts 1-4 are 8, 0, 0, and 30 respectively.)

In the present disclosure, n is set at 2. Therefore, the processor 140 calculates the control color information D1 and D2 for the adaptive digital color chart by algorithms (1)-(3). As in the aforementioned example and Table 3, the control color information D1 of the adaptive digital color chart is shown as follows.

$$(\text{red pixel, green pixel, blue pixel}) = \frac{\sum_{i=1}^{N} \frac{R_i}{(dist_i)^2}}{\sum_{i=1}^{N} \frac{1}{(dist_i)^2}}, \frac{\sum_{i=1}^{N} \frac{G_i}{(dist_i)^2}}{\sum_{i=1}^{N} \frac{1}{(dist_i)^2}},$$

$$\frac{\sum_{i=1}^{N} \frac{B_i}{(dist_i)^2}}{\sum_{i=1}^{N} \frac{1}{(dist_i)^2}} = \left( \frac{\frac{35}{10001} + \frac{23}{10001} + \frac{60}{10001} + \frac{79}{10001}}{\frac{1}{10001} + \frac{1}{10001} + \frac{1}{10001} + \frac{1}{10001}}, \right.$$

$$\frac{\frac{88}{10001} + \frac{69}{10001} + \frac{30}{10001} + \frac{136}{10001}}{\frac{1}{10001} + \frac{1}{10001} + \frac{1}{10001} + \frac{1}{10001}},$$

$$\left. \frac{\frac{8}{10001} + \frac{0}{10001} + \frac{0}{10001} + \frac{30}{10001}}{\frac{1}{10001} + \frac{1}{10001} + \frac{1}{10001} + \frac{1}{10001}} \right) = (49, 81, 10)$$

The control color information D1 of the adaptive digital color chart is shown as follows.

$$(\text{red pixel, green pixel, blue pixel}) =$$
$$\left( \frac{50 + 42 + 81 + 82}{1+1+1+1}, \frac{96 + 80 + 53 + 140}{1+1+1+1}, \frac{10 + 0 + 5 + 37}{1+1+1+1} \right) = (64, 92, 13)$$

Accordingly, the processor 140 acquires the environmental brightness (i.e., 500 Lux) and the object distance (i.e., 15 cm) as the specific brightness and the specified object distance of the adaptive digital color chart, and calculates the control color information D1 and D2 of the adaptive digital color chart to be D1=(49, 81, 10) and D2=(64, 92, 13).

After calculating the control color information of the adaptive digital color chart, the processor 140 finds the nearest control color information D1=(49, 81, 10) and D2=(64, 92, 13) from the control color information stored in the color chart database. For example, the processor 140 calculates the control color information D1 and D2 having the nearest physiological phenotype by an algorithm, e.g., the control color information D1=(49, 81, 10) indicates that the physiology information of the designated crop is mature degree 31~60%, and the control color information D2=(64, 92, 13) indicates that the physiology information of the designated crop is mature degree 81~100%. The processor 140 can calculate the physiology information corresponding to the control color information D1 and D2 by another method. The present disclosure is not limited thereto.

When the processor 140 determines the adaptive digital color chart to use, the processor 140 compares color information data of the image to be detected Imd with each control color information data in the adaptive digital color chart, to select one of the control color information data according to the correlation with the control color information data and the color information data. More specifically, the processor 140 determines which control color information data of the adaptive digital color chart that the color information data of the image to be detected Imd has the highest correlation with by a correlation analysis (indicating that the color information of the image to be detected Imd is closest to which control color information). In the present disclosure, the correlation analysis is a correlation function, to calculate the correlative degree with the color information of the image to be detected Imd and each control color information of the adaptive digital color chart. The correlation function is shown as algorithm (4).

$$\text{correlation function} = \frac{1}{\sqrt{(R0 - Ri)^2 + (G0 - Gi)^2 + (B0 - Bi)^2 + 1}}, i = 1 \sim n \quad \text{algorithm (4)}$$

R0, G0, and B0 indicate the red pixel, the green pixel, and the blue pixel of the color information of the image to be detected Imd respectively. Ri, Gi, and Bi indicate the nth red pixel, green pixel, and blue pixel of the control color information. Therefore, when the control color information has four, and the third control color information having the highest correlative degree according to the correlation function, this indicates that the color information of the image to be detected Imd is closest to the third control color information. At the present, the processor 140 selects the third control color information and displays the physiology information corresponding to the third control color information to the displayer 160, to provide farmers with an understanding the present physiological phenotype of the designated crop. The processor 140 can use other correlation analysis to acquire the control color information having the highest correlation with color information of the image to be detected Imd.

As in the aforementioned example and Table 2, the adaptive digital color chart is the digital color chart 10, and has the control color information data D1-D4. When the processor 140 acquires the color information (red pixel, green pixel, blue pixel) of the image to be detected Imd is (20, 60, 0). The correlative degree with the color information of the image to be detected Imd and the control color information D1 is shown as follows.

$$\frac{1}{\sqrt{(20 - 35)^2 + (60 - 8)^2 + (0 - 8)^2 + 1}} = \frac{1}{\sqrt{2994}} = \frac{1}{54.7} = 0.018$$

The correlative degree with the color information of the image to be detected Imd and the control color information D2 is shown as follows.

$$\frac{1}{\sqrt{(20 - 23)^2 + (60 - 69)^2 + (0 - 0)^2 + 1}} = \frac{1}{\sqrt{91}} = \frac{1}{9.54} = 0.104$$

The correlative degree with the color information of the image to be detected Imd and the control color information D3 is shown as follows;

$$\frac{1}{\sqrt{(20-19)^2+(60-59)^2+(0-0)^2+1}} = \frac{1}{\sqrt{3}} = \frac{1}{1.732} = 0.577$$

The correlative degree with the color information of the image to be detected Imd and the control color information D4 is shown as follows.

$$\frac{1}{\sqrt{(20-14)^2+(60-64)^2+(0-0)^2+1}} = \frac{1}{\sqrt{53}} = \frac{1}{7.28} = 0.137$$

Accordingly, correlative degree with the color information of the image to be detected Imd and the control color information D3 is highest. Therefore, the processor 140 selects the control color information D3, and displays the physiology information (i.e., the mature degree is 31~60%) of the control color information D3 to the displayer 160, to provide farmers an understanding of the present physiological phenotype of the designated crop (e.g., banana).

Figure 3:
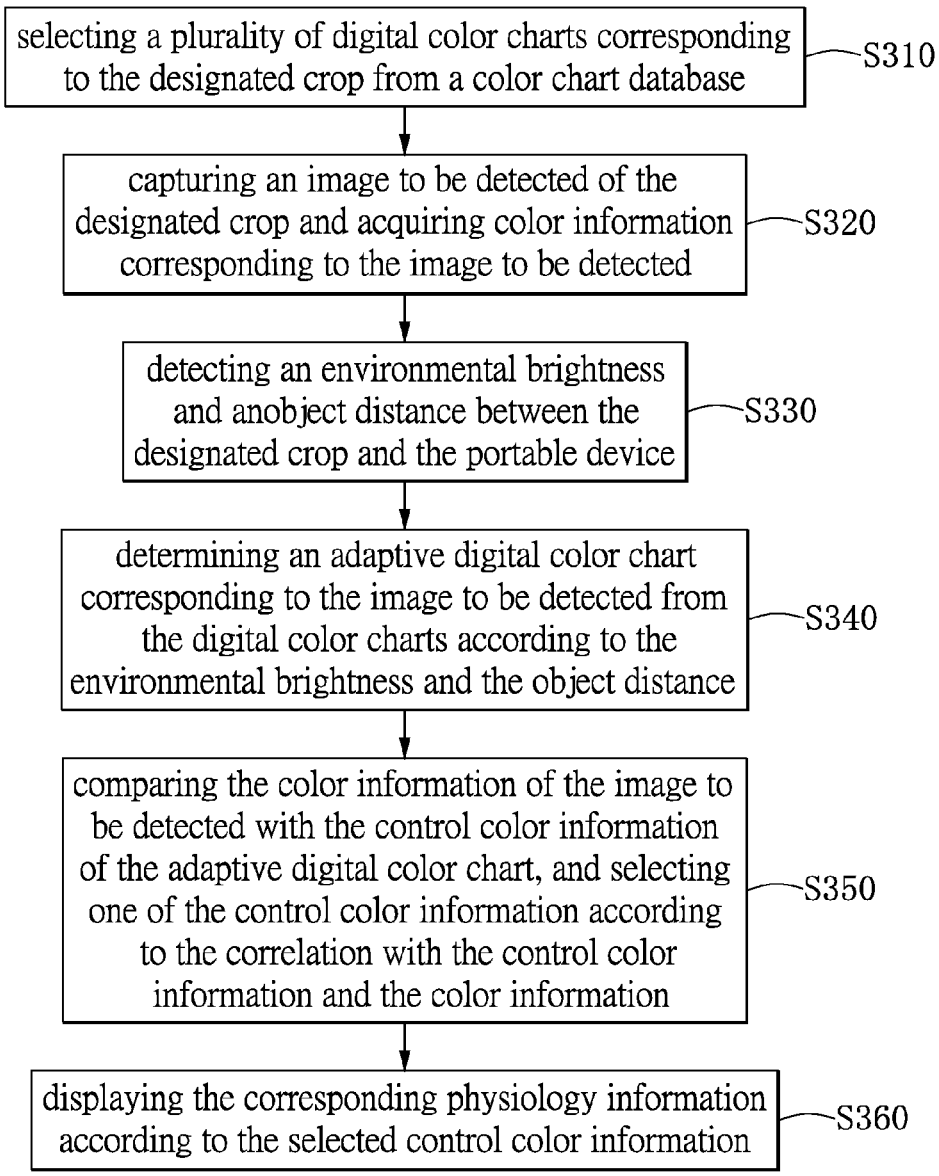
FIG. 3 is a flowchart of a method for detecting physiological phenotype of crops according to an exemplary embodiment of the present disclosure.

From the aforementioned exemplary embodiments, the present invention may generalize a method for detecting physiological phenotype of crops, which is adapted for the portable device 100, to detect a physiological phenotype of a designated crop. Please refer to FIG. 3 in conjunction with FIG. 1. FIG. 3 shows a flowchart of a method for detecting physiological phenotype of crops according to an exemplary embodiment of the present disclosure. Firstly, the processor 140 of the portable device 100 selects a plurality of digital color charts corresponding to the designated crop from a color chart database (step S310).

Each digital color chart corresponds to a specific brightness and a specified object distance (as the specific brightness and the specified object distance of the digital color chart 10 shown in Table 1 are 400 Lux and 16 cm respectively) Each digital color chart has a plurality of control color information (as the digital color chart 10 has the control color information D1-D4 shown in Table 2), and each control color information corresponds to physiological information of the designated crop (as the maturity degree of banana in the control color information D1-D4 shown in Table 2). Next, the camera 110 captures an image to be detected of the designated crop and the processor 140 acquires color information corresponding to the image to be detected Imd (step S320). Next, the environmental light sensor 120 detects an environmental brightness and the distance sensor 130 detects an object distance between the designated crop and the portable device 100 (step S330). Steps S310-S330 have been described in the embodiments above, and thus will not be further described herein.

Next, the processor 140 of the portable device 100 determines an adaptive digital color chart corresponding to the image to be detected Imd from the digital color charts according to the environmental brightness and the object distance (step S340). As in the aforementioned example, the processor 140 selects the digital color chart 10 as the adaptive digital color chart from the digital color charts 7-12. Step S340 has been described in the embodiments above, and thus will not be further described herein.

After acquiring the adaptive digital color chart, the processor 140 compares the color information of the image to be detected Imd with the control color information of the adaptive digital color chart. Then the processor 140 selects one of the control color information data according to the correlation with the control color information and the color information (step S350). As the aforementioned example, the processor 140 compares the color information (red pixel, green pixel, blue pixel)=(20, 60, 0) with the control color information D1-D4, and then selects the control color information D3 having the highest correlation with the color information. Equally, Step S350 has been described in the embodiments above, and thus will not be further described herein.

Next, the processor 140 displays the corresponding physiology information according to the selected control color information to the displayer 140 (step S360). As in the aforementioned example, the physiology information of the control color information D3 indicates the mature degree to be 31~60%. Step S360 has been described in the embodiments above, and thus will not be further described herein. Accordingly, farmers can understand the present physiological phenotype of the designated crop through the method for detecting physiological phenotype.

Figure 4:
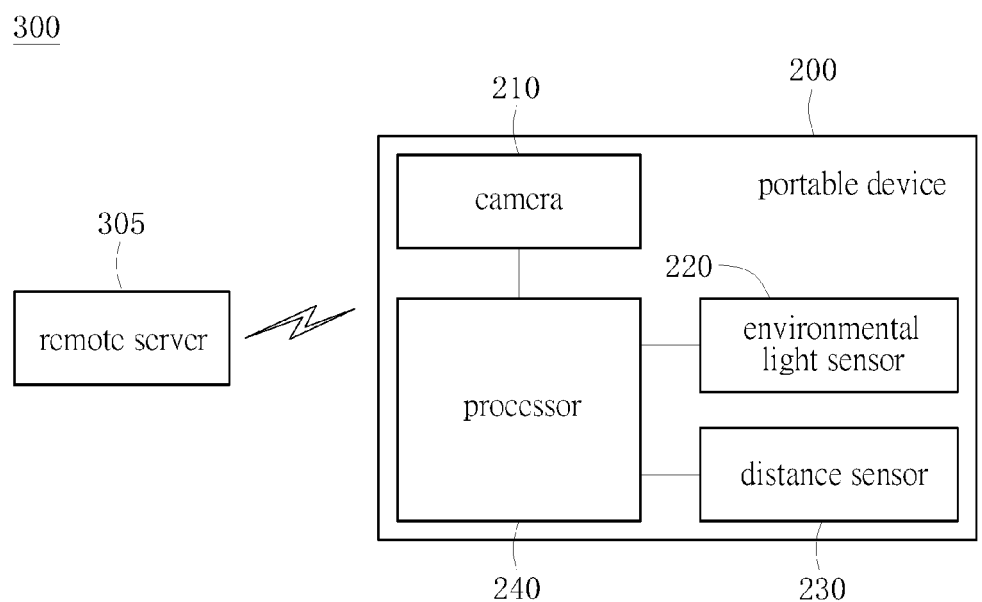
FIG. 4 is a diagram of a system according to an exemplary embodiment of the present disclosure.

Next, please refer to FIG. 4, which shows a diagram of a system according to an exemplary embodiment of the present disclosure. As shown in FIG. 4, the detection system 300 includes a remote server 305 and a portable device 200, to detect a physiological phenotype of a designated crop. The remote server 305 stores a plurality of digital color charts of crops, and there are digital color charts of the designated crop in the digital color charts of the crops. With respect to the digital color charts of the remote server 305 which are substantially the same as that of the color database 150 of the portable device 100, the detailed description is omitted.

The portable device 200 is connected to the remote server 305 through a wireless network, to receive the digital color charts, the specific brightness and the specified object distance of each digital color chart, and the control color information data. With respect to the camera 210, the environmental light sensor 220, the distance sensor 230, and the processor 240 of the portable device 200 are substantially the same as the camera 110, the environmental light sensor 120, the distance sensor 130, and the processor 140 of the portable device 100, so detailed description is omitted.

The difference is that the digital color charts of the designated crop are stored in the remote server 305. Therefore, the portable device 200 does not store the digital color charts in order to save the storage space of the portable device 200. Besides, when the digital color charts are updated, the portable device 200 can also receive the updated digital color charts from the remote server 305.

In summary, the exemplary embodiments of the present disclosure provide a method, a portable device, and a system for detecting physiological phenotype of crops, which determine a digital color chart according to the distance between the designated crop and the portable detection device and the present environmental brightness, and then determine to which control color information of the selected digital color chart the appearance color of the designated crop belongs. This can avoid causing the error result because of the influence of the subjective determination and the environmental light. Therefore, the selected control color information may correspond to physiology information of the designated crop, to provide farmers with an understanding of the present physiological phenotype of the designated crop.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A method for detecting physiological phenotype of crops, adapted for a portable device, which detects a physiological phenotype of a designated crop, and the method comprising the steps of:
   selecting a plurality of digital color charts corresponding to the designated crop from a color chart database, wherein each digital color chart corresponds to a specific brightness and a specified object distance, each digital color chart has a plurality of control color information, and each control color information corresponds to physiological information of the designated crop;
   capturing an image to be detected of the designated crop and acquiring color information corresponding to the image to be detected;
   detecting an environmental brightness and an object distance between the designated crop and the portable device;
   determining an adaptive digital color chart corresponding to the image to be detected from the digital color charts according to the environmental brightness and the object distance;
   comparing the color information of the image to be detected with the control color information of the adaptive digital color chart, and selecting one of the control color information according to the correlation with the control color information and the color information; and
   displaying the corresponding physiology information according to the selected control color information;
   wherein in the step of acquiring the color information corresponding to the image to be detected, further comprises:
   averaging a plurality of pixels of the image to be detected, or selecting the pixels having the most amount of the color information corresponding to the designated crop, to acquire the color information data indicating the image to be detected.

2. The method according to claim 1, wherein in the step of capturing the image to be detected of the designated crop, further comprises:
   by the portable device, taking a crop image and providing a region for detection to capture the image to be detected from the crop image through the region for detection.

3. The method according to claim 1, wherein in the step of determining the adaptive digital color chart corresponding to the image to be detected from the digital color chart, further comprises:
   selecting one of the digital color charts having the highest correlation with the environmental brightness and the object distance according to the specific brightness and the specified object distance of each digital color chart, and taking the selected digital color chart as the adaptive digital color chart for the image to be detected.

4. The method according to claim 3, wherein in the step of selecting one of the digital color charts having the highest correlation, further comprises:
   selecting at least one digital color chart having the highest correlation with the environmental brightness from the digital color charts according to the specific brightness of each digital color chart; and
   selecting one of the digital color chart having the highest correlation with the object distance from at least one digital color chart having the highest correlation with the environmental brightness according to the specified object distance of each digital color chart, and taking the selected digital color chart as the adaptive digital color chart for the image to be detected.

5. The method according to claim 1, wherein in the step of selecting one of the control color information, further comprises:
   selecting one of the control color information of the adaptive digital color chart as the selected control color information by a correlation analysis, wherein the selected control color information has the highest correlation with the color information of the image to be detected.

6. The method according to claim 1, wherein in the step of determining the adaptive digital color chart corresponding to the image to be detected, further comprises:
   selecting at least two digital color charts having the higher correlation with the environmental brightness and the object distance from the digital color charts according to the specific brightness and the specified object distance of each digital color chart, and calculating the control color information for the adaptive digital color chart according to the selected at least two digital color charts, wherein the specific brightness and the specified object distance of the adaptive digital color chart are respectively the environmental brightness and the object distance.

7. A portable device for detecting crops, used for detecting a physiological phenotype of a designated crop, and the portable device comprising:
   a camera, configured for capturing an image to be detected of the designated crop;
   an environmental light sensor, configured for detecting an environmental brightness;
   a distance sensor, configured for detecting an object distance between the designated crop and the portable device;
   a color chart database, configured for storing a plurality of digital color charts of the designated crop, wherein each digital color chart corresponds to a specific brightness and a specified object distance, and has a plurality of control color information, and each control color information corresponds to physiology information of the designated crop; and
   a processor, electrically connected to the camera, the environmental light sensor, the distance sensor, and the color chart database, the processor is configured for averaging a plurality of pixels of the image to be detected or selecting the pixels having the most amount of the color information corresponding to the designated crop to acquire color information corresponding to the image to be detected, selecting the digital color charts corresponding to the designated crop from the color chart database according to the designated crop, determining an adaptive digital color chart corresponding to the image to be detected from the digital color charts according to the environmental brightness and the object distance, and comparing the color information of the image to be detected with the control color information of the adaptive digital color chart, to select one of the control color information according to the correlation with the control color information and the color information, and to display the corresponding physiology information according to the selected control color information in a displayer.

8. The portable device according to claim 7, wherein the camera takes a crop image indicating the designated crop, and the processor provides a region for detection to capture the image to be detected from the crop image through the region for detection.

9. The portable device according to claim 7, wherein the processor selects one of the digital color charts having the highest correlation with the environmental brightness and the object distance according to the specific brightness and the specified object distance of each digital color chart, and takes the selected digital color chart as the adaptive digital color chart for the image to be detected.

10. The portable device according to claim 9, wherein the processor selects at least one digital color chart having the highest correlation with the environmental brightness from the digital color charts according to the specific brightness of each digital color chart, and selects one of the digital color chart having the highest correlation with the object distance from at least one digital color chart having the highest correlation with the environmental brightness according to the specified object distance of each digital color chart, to take the selected digital color chart as the adaptive digital color chart for the image to be detected.

11. The portable device according to claim 7, wherein the processor selects one of the control color information data of the adaptive digital color chart as the selected control color information by a correlation analysis wherein the selected control color information data has the highest correlation with the color information of the image to be detected.

12. The portable device according to claim 7, wherein the processor selects at least two digital color charts having the higher correlation with the environmental brightness and the object distance from the digital color charts according to the specific brightness and the specified object distance of each digital color chart, and calculates the control color information for the adaptive digital color chart according to the selected at least two digital color charts, wherein the specific brightness and the specified object distance of the adaptive digital color chart are respectively the environmental brightness and the object distance.

13. A system for detecting crops, used for detecting a physiological phenotype of a designated crop, and the system comprising:
   a remote server, configured for storing a plurality of digital color charts of the designated crop, wherein each digital color chart corresponds to a specific brightness and a specified object distance, and has a plurality of control color information, and each control color information corresponds to physiology information of the designated crop;
   a portable device, coupled to the remote server through a wireless network, to receive the digital color chart, the specific brightness, the specified object distance of each digital color chart, and the control color information, the portable device comprising:
   a camera, configured for capturing an image to be detected of the designated crop;
   an environmental light sensor, configured for detecting an environmental brightness;
   a distance sensor, configured for detecting an object distance between the designated crop and the portable device; and
   a processor, electrically connected to the camera, the environmental light sensor, the distance sensor, and the color chart database, the processor is configured for averaging a plurality of pixels of the image to be detected or selecting the pixels having the most amount of the color information corresponding to the designated crop to acquire color information corresponding to the image to be detected, selecting the digital color charts corresponding to the designated crop from the color chart database according to the designated crop, determining an adaptive digital color chart corresponding to the image to be detected from the digital color charts according to the environmental brightness and the object distance, and comparing the color information of the image to be detected with the control color information of the adaptive digital color chart, to select one of the control color information according to the correlation with the control color information and the color information, and to transmit the selected control color information to the remote server through the wireless network for displaying the corresponding physiology information.

14. The system according to claim 13, wherein the camera takes a crop image indicating the designated crop, and the processor provides a region for detection to capture the image to be detected from the crop image through the region for detection.

15. The system according to claim 13, wherein the processor selects one of the digital color charts having the highest correlation with the environmental brightness and the object distance according to the specific brightness and the specified object distance of each digital color chart, and takes the selected digital color chart as the adaptive digital color chart for the image to be detected.

16. The system according to claim 15, wherein the processor selects at least one digital color chart having the highest correlation with the environmental brightness from the digital color charts according to the specific brightness of each digital color chart, and selects one of the digital color chart having the highest correlation with the object distance from at least one digital color chart having the highest correlation with the environmental brightness according to the specified object distance of each digital color chart, to take the selected digital color chart as the adaptive digital color chart for the image to be detected.

17. The system according to claim 13, wherein the processor selects one of the control color information data of the adaptive digital color chart as the selected control color information by a correlation analysis wherein the selected control color information has the highest correlation with the color information of the image to be detected.

* * * * *